(12) United States Patent
Araos Almendras

(10) Patent No.: US 11,548,034 B2
(45) Date of Patent: Jan. 10, 2023

(54) ACCELERATING CYCLONE THAT SEPARATES SOLIDS PARTICLES

(71) Applicants: BIODRYINGTECH SPA, Santiago (CL); EMPRESAS IANSA S.A., Santiago (CL)

(72) Inventor: Roberto Enrique Araos Almendras, Santiago (CL)

(73) Assignees: BIODRYINGTECH SPA, Santiago (CL); EMPRESAS IANSA S.A., Santiago (CL)

( * ) Notice: Subject to any disclaimer, the term of this patent is extended or adjusted under 35 U.S.C. 154(b) by 447 days.

(21) Appl. No.: 16/624,620

(22) PCT Filed: Jun. 21, 2017

(86) PCT No.: PCT/CL2017/050027
§ 371 (c)(1),
(2) Date: Dec. 19, 2019

(87) PCT Pub. No.: WO2018/232540
PCT Pub. Date: Dec. 27, 2018

(65) Prior Publication Data
US 2020/0122199 A1     Apr. 23, 2020

(51) Int. Cl.
*B04B 5/12*     (2006.01)
*B07B 7/083*    (2006.01)
(Continued)

(52) U.S. Cl.
CPC .............. *B07B 7/083* (2013.01); *B04C 5/103* (2013.01); *B04C 9/00* (2013.01); *F26B 17/107* (2013.01); *B04C 2009/007* (2013.01)

(58) Field of Classification Search
CPC ........... B07B 7/083; B04C 5/103; B04C 9/00; B04C 2009/007; B04C 5/081;
(Continued)

(56) References Cited

U.S. PATENT DOCUMENTS 6,928,692 B2 *   8/2005   Oh .................. A47L 9/1666
                                              55/299
7,351,269 B2 *   4/2008   Yau ................. A47L 9/20
                                              55/296
(Continued)

FOREIGN PATENT DOCUMENTS

WO      2013173115 A1    11/2013
WO      2015084901 A1     6/2015
WO      2018232540 A1    12/2018

OTHER PUBLICATIONS

ISR/WO from parent application PCT/CL2017/050027 dated Mar. 20, 2018.

*Primary Examiner* — Dung H Bui
(74) *Attorney, Agent, or Firm* — Vorys, Sater, Seymour and Pease LLP

(57) ABSTRACT

The present invention refers to an accelerating cyclone that separates solid particles, comprising in its general structure a lower conical body (1) (17A and 17B), comprising a lower opening (18), a central cylindrical body (2) immediately above the conical body (1) whose diameter is smaller than the largest diameter of the conical body cone (1), and a third upper, also cylindrical, body (3) of smaller diameter than the diameter of the central cylindrical body (2), comprising a side opening for the acceleration air output (5); where the cylindrical central body (2) allows to accelerate the speed of the solid material particles and is the cyclone pressure chamber; and where said cylindrical central body (2) comprises a side opening for the acceleration air input (8) and at least one duct (9).

9 Claims, 6 Drawing Sheets

(51) Int. Cl.
*B04C 5/103* (2006.01)
*B04C 9/00* (2006.01)
*F26B 17/10* (2006.01)

(58) Field of Classification Search
CPC ....... B04C 2005/136; B04C 5/13; B04C 5/04; B04C 2009/005; B04C 2009/008; F26B 17/107; F26B 5/08; B01D 45/16; A47L 9/108; A47L 9/1683; A47L 9/1691; A47L 9/20; Y10S 55/03
See application file for complete search history.

(56) References Cited

U.S. PATENT DOCUMENTS

| | | | | |
|---|---|---|---|---|
| 7,594,941 | B2* | 9/2009 | Zheng | B04C 9/00 55/299 |
| 7,704,290 | B2* | 4/2010 | Oh | A47L 9/1666 15/352 |
| 9,393,532 | B2* | 7/2016 | Ramalingam | B01F 23/451 |
| 9,980,619 | B2* | 5/2018 | Cho | A47L 9/1675 |
| 10,537,220 | B2* | 1/2020 | Cho | A47L 9/1666 |
| 2001/0025395 | A1* | 10/2001 | Matsumoto | A47L 9/1691 55/447 |
| 2004/0025285 | A1* | 2/2004 | McCormick | A47L 9/19 15/352 |
| 2005/0198766 | A1* | 9/2005 | Nam | A47L 9/20 15/352 |
| 2005/0217067 | A1* | 10/2005 | Rew | A47L 9/20 15/352 |
| 2006/0042202 | A1* | 3/2006 | Lee | A47L 9/0081 55/289 |
| 2007/0039900 | A1 | 2/2007 | Levitt | |
| 2007/0186522 | A1* | 8/2007 | Hato | A47L 9/20 55/467 |
| 2008/0295466 | A1* | 12/2008 | Cha | A47L 9/122 55/296 |
| 2012/0010063 | A1 | 1/2012 | Levitt et al. | |
| 2012/0145609 | A1 | 6/2012 | Caffell et al. | |
| 2018/0055318 | A1* | 3/2018 | Gottschall | A47L 9/325 |

* cited by examiner

ACCELERATING CYCLONE THAT SEPARATES SOLIDS PARTICLES

SCOPE OF THE INVENTION

The invention relates to dewatering and pulverizing organic and inorganic solid products in different areas of the state of the art, e.g. as food raw materials, in producing vegetable and fruit powder and flours, in agro-industrial wastes, in sludge final disposal from sanitary industries, and sludge and byproducts from several manufacturing industries such as fishing, livestock, poultry, forestry and mining.

The invention consists of a spinning-top-shaped accelerating cyclone that separates solid particles, which provides dewatered solid products in powder and/or granules.

BACKGROUND OF THE INVENTION

Constant research in different areas of the art has been carried out based on the need to regulate the costs associated to the processes of drying, dewatering and pulverizing solid substances, and the processes of collecting solid particulate material.

Cyclones, consisting essentially of a sedimentation chamber operating with centrifugal acceleration instead of gravitational acceleration, are the most commonly used equipment in retrieving or settling solid particles. Cyclones have been used for years to retrieve solid particles due to the lower manufacture and operability cost thereof. In general, the physical structure of a cyclone comprises a vertical cylinder with a lower conical section, which forces the descending vortex to change its direction, which results in an increased particle collection as the turning radius is reduced. The solid material to be separated enters as mixed with gas through a tangential inlet that said vertical cylinder has, and the separated solid material is removed through an open lower mouth located on the lower conical section. Cyclones are basically simple constructions with no moving parts, which makes maintenance operations easier. Cyclones are equipment with very good performance in retrieving solids, but they are not as suitable if the particles to be separated are too small, e.g. with a diameter less than about 10 µm. Additionally, its efficiency decreases when the particles of the materials to be separated have a tendency to stick, thus remaining stuck in the corners formed by the joints between the upper vertical body and lower conical section, and in the inner walls of the lower cone as said cone is downwardly convergent and has an inner surface affected by the action of gravity and the speed effect on the falling particles as the diameter of the conical part decreases.

Additionally, grinding systems that take the air use into account to improve efficiency, either by using a large volume of air that is generated by a fan or by using high-speed air that is also generated by a fan, have been developed. A further drying method that has been developed uses a variant consisting of a spray drying, which operates by reducing the material to be dried to droplets, then subjecting said droplets to a large amount of hot air in order to provide the necessary heat to dry the liquid. The equipment that is associated with this method is referred to as spray dryer.

Considering the above, it is necessary to have a conical separator equipment or cyclone that is suitable to separate particles from the solid material of any type and, without losing efficiency, that is capable of keeping its inner surfaces clean even when the particles to be separated are of the sticky type.

U.S. Pat. No. 6,971,594 describes an apparatus and method for compressed air vortex flow (circular or rotational flow at high velocity) in grinding solid material. The grinding apparatus therein uses high velocity compressed air in the grinding process for grinding, and also drying, diverse materials including by way of example, but not limited to, glass, grain, paper, plastic, aluminum and granite. The grinding apparatus includes an annular upper enclosure defining an upper chamber into which material to be ground is introduced, a conical lower enclosure defining a lower chamber affixed in vertical orientation in tandem with the annular upper enclosure. The annular upper enclosure has holes for introducing compressed air in its sidewalls. The air is introduced relatively circumferentially into the upper chamber so as to generate a circular vortex flow of air for material grinding and drying to take place. The air flow is exhausted through a pipe located in the annular upper enclosure, and the dried material is discharged through a lower end of the lower enclosure.

U.S. Pat. No. 4,251,243 describes an improved cyclonic separator comprising a lower frustoconical body that has a conical wall, which ends at its lower end with a cylindrical short wall forming the mouth for discharging solid material. At its upper end having a larger diameter, said conical body ends in a radially outwardly directed flange over which an annular lid may be suitably mounted. On the other hand, the upper body is formed by a conical wall, whose upper lower diameter end is closed by means of a circular lid through whose center the suction duct is provided and its larger diameter end is inserted in the lower cone.

U.S. Pat. No. 5,791,066 describes a cyclone dryer comprising a cyclonic chamber consisting of a lower cone-shaped chamber, a lower cylindrical chamber located immediately above the cone, an upper cylindrical chamber located on the lower cylindrical chamber, where both cylindrical chambers have a substantially similar outside diameter. In one embodiment, both cylindrical chambers can be as many as one. The lower cone has the material outlet. As the cross section of the cone-shaped chamber gets smaller to the bottom, the air starts to spin upwards, and this way only solid material exits. The high-speed airstream enters the cylindrical chamber and is forced to spirally rotate downwards against the lower, cone-shaped portion, thus creating a downward vortex. An air outlet is on the top, over the cylindrical chambers.

U.S. Pat. No. 4,966,703 describes a cyclone-type separator for separating two liquid components, one of greater density and the other of lesser density, by means of a separating chamber that is generally tapered from a larger diameter end to a smaller diameter end. The separating chamber has an overflow outlet for the less dense component, located at the larger diameter end, and an underflow outlet at the smaller diameter end, for the outflow of the denser component. The cyclone comprises a helical flight to direct the flow (the heaviest) downwards, thus accelerating the fluid.

CN201692732, which corresponds to a utility model, provides a compressed air dewatering equipment; compressed air enters the dewatering equipment which consists of a conical shell body to form a vortex in the cyclone body.

The dewatering equipment, in order to be more efficient, dewaters and cleans the fluid by means of centrifugal force and by the action of baffles that drive the fluid to the bottom of the cyclone. The dewatering equipment thus completes the process of removing impurities, oil stains and water in quite big drops. The baffles separate air-water in the cyclone body.

DE1245267 describes a cyclone dust separator into which compressed air is injected through the upper nozzles, where a helical accelerator is provided to take the air/dust particles and directs the densest to the bottom.

DE 10317772 describes a dust separator with an air current with two series-connected cyclones (1, 2) of different separation, in which the highest cone-shaped cyclonic power is tapered from the inlet with an equipment in order to generate an accelerated air current with a dust-laden air inlet. The cyclone has a truncated helical sector with guide plates that enable direct the fluid to the bottom.

One of the objects of the present invention is developing a cyclone equipment that separates solid particles and assures an effective separation or retrieval of solid particles powder with low moisture percentage.

SUMMARY OF THE INVENTION

The present invention is a spinning-top-shaped accelerating cyclone that separates solid particles in order to form and separate powdered and/or granulated dewatered, or low-moisture-percentage, solid products.

Particularly, the present invention describes a cyclone equipment that separates solid particles powder comprising a lower conical body, a central cylindrical body immediately above the conical body, and a third upper, also cylindrical, body of smaller diameter than the diameter of the central cylindrical body.

BRIEF DESCRIPTION OF THE DRAWINGS

The invention will be described below with reference to appended drawings, in which.

DETAILED DESCRIPTION OF THE INVENTION

Figure 1:
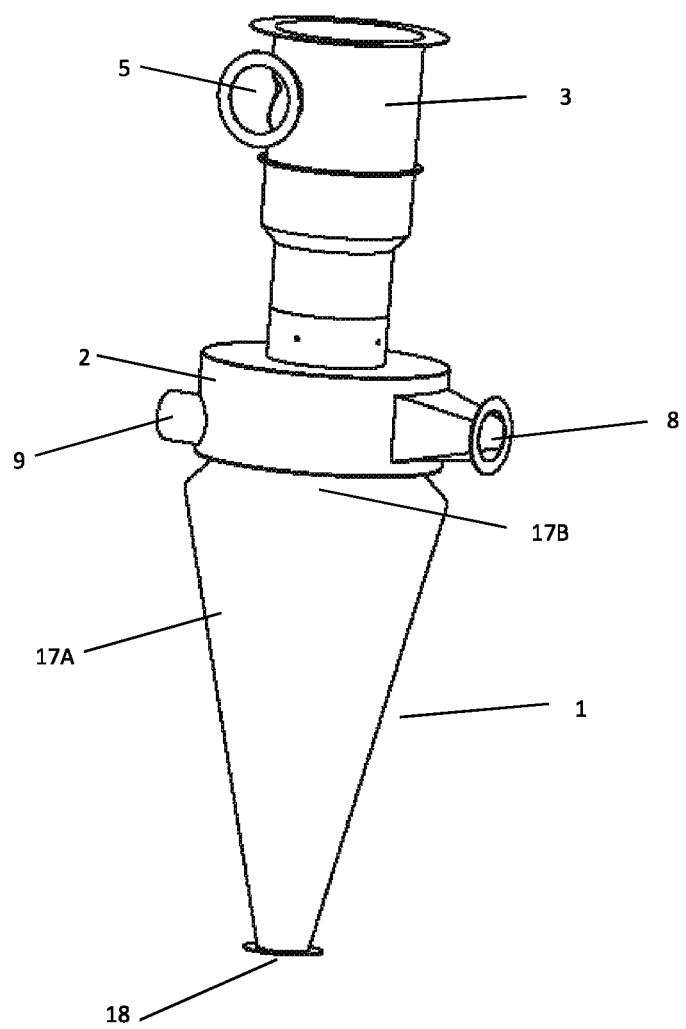
FIG. 1 shows a schematic view of the accelerating cyclone that separates solid particles of the present invention.
Figure 2:
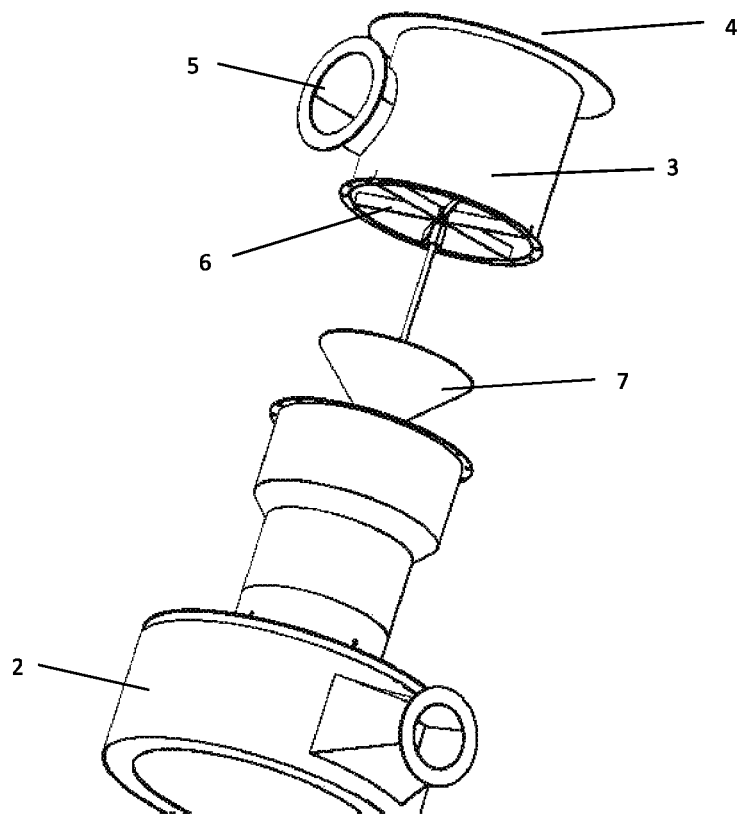
FIG. 2 shows a schematic view of the upper cylindrical body of the accelerating cyclone that separates solid particles of the present invention.
Figure 3:
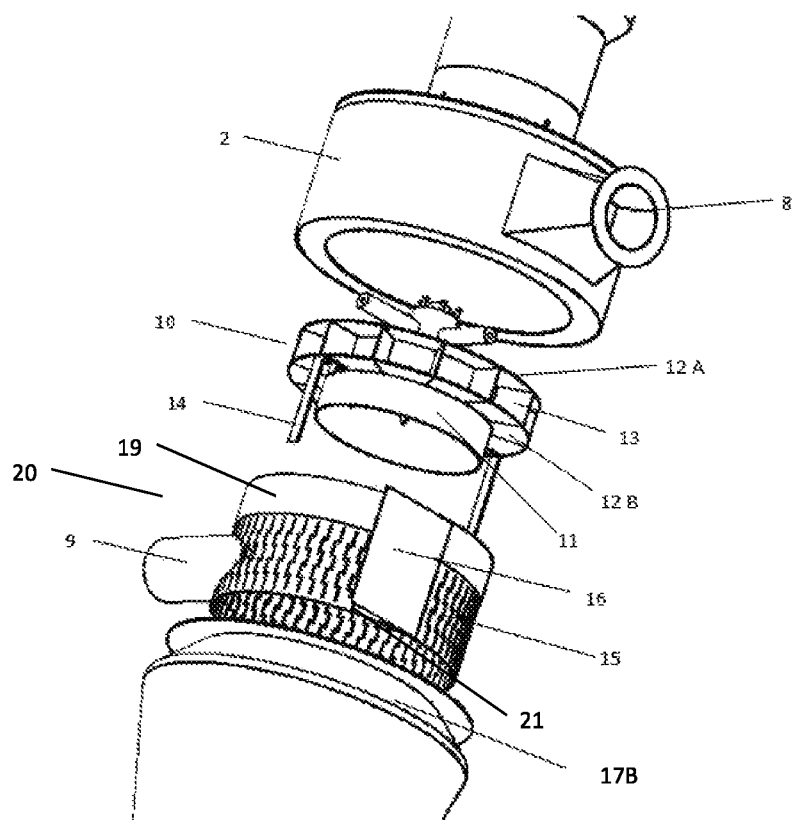
FIG. 3 shows a schematic view of the central cylindrical body of the accelerating cyclone that separates solid particles of the present invention.
Figure 4:
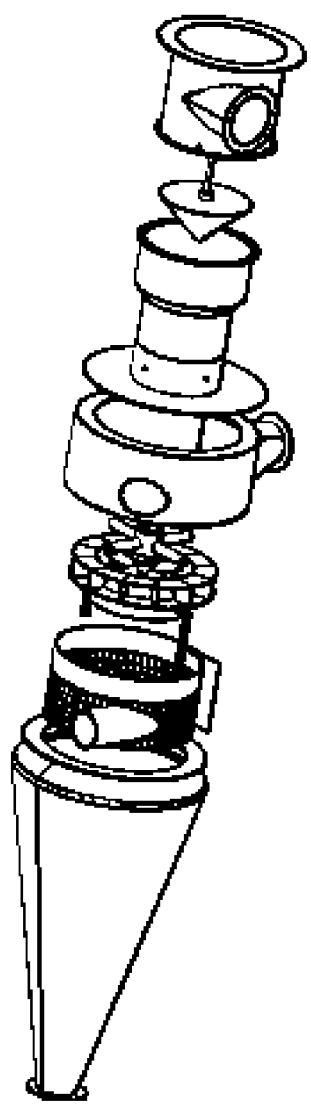
FIG. 4 shows a schematic view of the accelerating cyclone that separates solid particles of the present invention, with a view of the inner parts.
Figure 5:
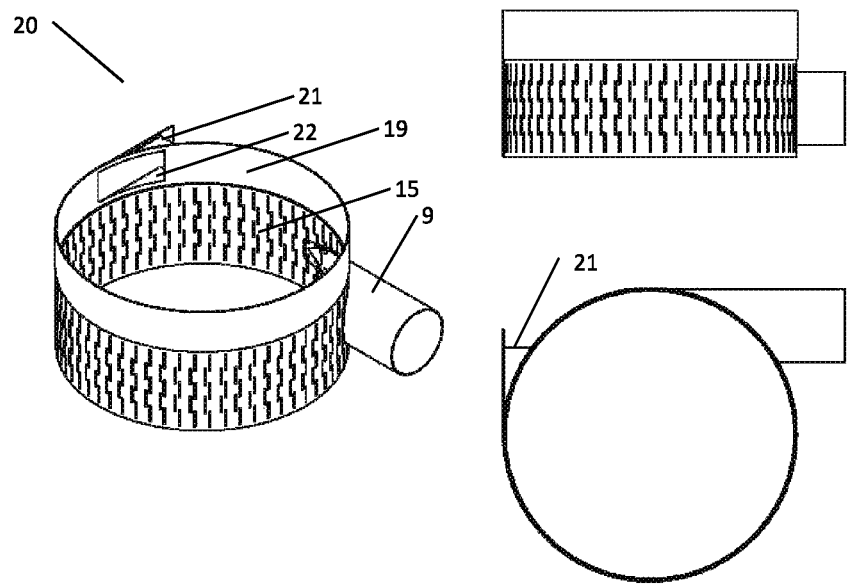
FIG. 5 shows a schematic view from the top and side perspectives of the inner cylinder (20) that is part of the central cylindrical body of the accelerating cyclone that separates solid particles of the present invention.
Figure 6:
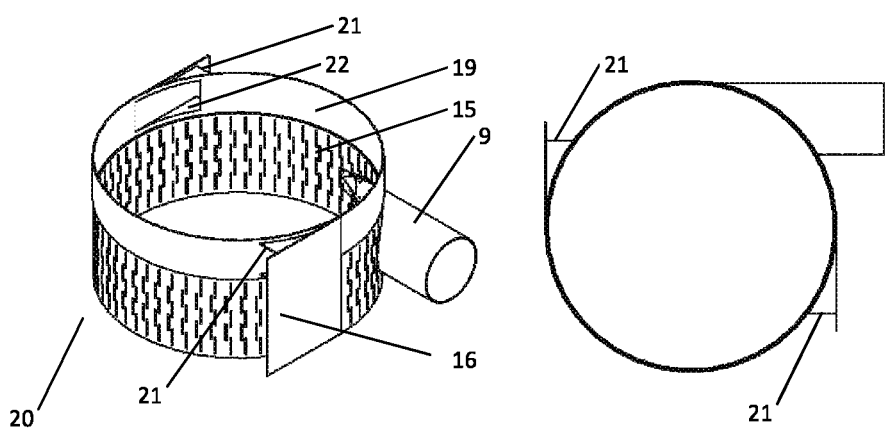
FIG. 6 shows a schematic view from the top perspective of the inner cylinder (20), embodiment of two ejector mechanisms, that are part of the central cylindrical body of the accelerating cyclone that separates solid particles of the present invention.
Figure 7:
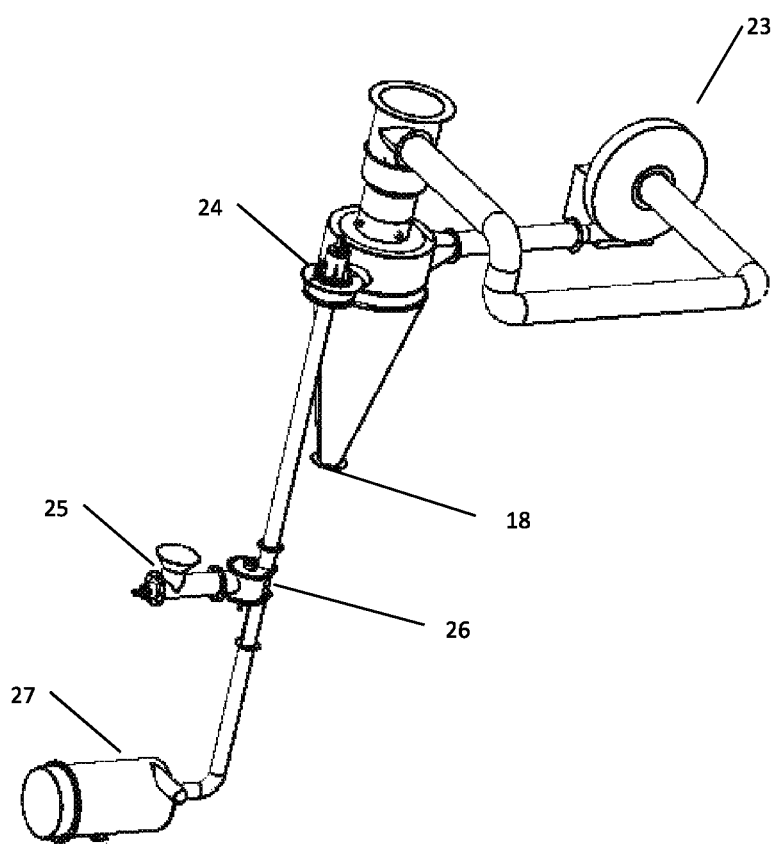
FIG. 7 shows a schematic view of the cyclone of the present invention, built in an integrated system to form and separate solid particles.

The present invention consists of a spinning-top-shaped accelerating cyclone that separates solid particles and assures an effective separation or retrieval of solid particles powder with low moisture percentage.

The accelerating cyclone that separates solid particles of the present invention separates micro-dispersed water from particulate material and comprises in its general structure a lower conical body (1), a central cylindrical body (2) immediately above the conical body (1) whose diameter is smaller than the largest diameter of the conical body cone (1), and a third upper, also cylindrical, body (3) of smaller diameter than the diameter of the central cylindrical body (2).

The upper cylindrical body (3) is structurally divided into two sections, one upper section of larger diameter and one lower section of smaller diameter. Said upper cylindrical body (3) vents and regulates the process air once the solid particles are separated, and it structurally comprises:

- an upper opening for the output of the process air (4);
- a side opening for the output of the acceleration air (5), which is located on the upper side portion of the section of larger diameter and which allows the air output to an auxiliary fan;
- an assembly of radial supports (6) located internally in the upper section of greater diameter; and
- an adjustment cone (7) of the outlet air, which is adjustable in its position allowing it to be adjusted upwards or downwards, and which is located internally in the section with the largest diameter, immediately below the assembly of radial supports (6), approximately halfway the total height of the upper cylindrical body (3).

The central cylindrical body (2), the function of which is to accelerate the speed of the material particles, is called "accelerating cyclone pressure chamber" and consists of the following elements:

- a side opening for the input of the acceleration air (8), which allows the inlet of air from an auxiliary fan;
- at least one duct (9) projecting from inside the central cylindrical body (2) for the input of the mixture of solid particles and air to the accelerating cyclone, located on the opposite side with respect to the side opening for the input of the acceleration air (8). In the case of having two or more ducts (14), the duct arrangement must be symmetrical in the perimeter of the central body (2);
- a rotating turbine (10) located inside said central cylindrical body (2), comprising a wheel formed by two concentric parallel rings (12A, 12B) and by several radial rectangular vanes (13) distributed along the perimeter of said rotating turbine (10) and supported on a central ring (11);
- at least two elongated pressure vanes (14) distributed symmetrically along the diameter of the rotating turbine (10), specifically along the diameter of the rings (12A, 12B) and joined perpendicularly to the lower ring (12B) of the wheel of the rotating turbine (10), said elongated pressure vanes (14) being parallel to the inner wall of said central body (2) and of a length equivalent to the height of said central body (2); and
- an inner cylinder (20) located inside said central body (2) which is formed by a non-slotted cylinder (19) located in the upper part of the inner cylinder (20) and by a slotted cylinder (15), located under the non-slotted cylinder, in the lower part of the inner cylinder (20). From one side of the slotted cylinder (15) emerges the duct (9) or the ducts (9) if more than one duct. The part of the non-slotted cylinder (19) is aligned with the radial rectangular vanes (13) of the rotating turbine (10) and has a height equivalent to or greater than the height of the radial rectangular vanes (13) of the rotating turbine (10). The inner cylinder (20) is constructed with at least one ejector mechanism, on its outer surface. In the case of having two or more ejector mechanisms, the disposition of the ejector mechanisms must be symmetrical in the perimeter of the inner cylinder (20). The ejector mechanism is formed by an opening (22) constructed in the part of the non-slotted cylinder (19), a vane that emerges tangentially (16) from the cylinders (19 and 15) over the opening (22) and two supports (21), located at the lateral ends of the tangentially emerging vane (16), which allow the union between the tangentially emerging vane (16) and the side walls of the cylinders (19 and 15) and that, at the same time, allow that the tangentially emerging vane (16) is kept tangentially on the opening (22). The vane that emerges tangentially (16) is for directing the air and allows the air to be directed perpendicular to the radial rectangular vanes (13) of the rotating turbine (10). The slotted cylinder (15) has a multiplicity of slots and has a smaller diameter than the outer diameter of the central body (2), but larger than the diameter of the rotating turbine (10). The air entering the ejector mechanism pushes down the particles, and rotates the rotating turbine (10) by the air outlet through the side opening for the output of the acceleration air (5) at high pressures and is perpendicular to the radial rectangular vanes (13) of the rotating turbine (10). The effect of the ejector mechanism and the slotted cylinder (15) consists of increasing the pressures and accelerating the particles entering through the duct (9) into the space formed between the rotating turbine wheel (10) and the slotted cylinder (15). For this reason, the chamber that is formed between the inner wall of the central cylindrical body (2) and the slotted cylinder (15) is called the pressure chamber for acceleration air, since the compressed air exits through the slots and through the ejector, and the ejector, as already mentioned, rotates the rotating turbine (10).

The lower conical body (1), whose function is to allow the output of the solid particles, comprises:
  a lower conical section (17A);
  a concave curve upper section (17B), located in the upper part of the conical lower section (17A), of smaller diameter with respect to the larger diameter of the conical lower section (17A); and
  a lower opening (18) for the output of the final product from solid particles.

The particle accelerating cyclone receives the stream of air-borne solid particles with micro-dispersed water through the supply duct (9). The air-borne solid particles go directly into the pressure chamber where the rotating turbine (10) and the slotted cylinder (15) are located. At the moment the air-borne solid particles come into contact with the rotating turbine (10), said rotating turbine (10) is rotating at a speed higher than the speed of the solid particles, due to the air input through the acceleration air inlet (8). The rotating turbine (10) generates a circulatory movement of the air, and the elongated pressure vanes (14) generate surface pressures and prevent the reduction of the particle speed, since the elongated pressure vanes (14) move at a higher speed than the particles. Furthermore, said pressure vanes (14) are spaced at a minimum distance from the slotted cylinder walls (15) in order to ensure that no solid material remains trapped on the surface of said slotted cylinder. In addition to rotating the product due to the air circulatory movement, the rotary turbine (10) pushes the product down, i.e. towards the lower conical body (1) due to the pressure created by the ejector mechanism. On the other hand, the slotted cylinder (15), through its multiplicity of slots, makes the solid material particles not to touch the surface, not to stick or adhere to the walls and, therefore, that they remain suspended inside the cyclone, i.e. it achieves the surface dispersion of the material particles. However, as already stated, the elongated pressure vanes (14) completely ensure that the solid particles do not get trapped in the slotted cylinder (15). The suspended solid particles are displaced by the centrifugal force towards the lower conical body (1) of the accelerating cyclone, achieving its sedimentation and expulsion through the lower opening (18) for the output of the final product from the conical body. Additionally, the concave curve upper section (17B) having the lower conical body (1) at its upper part helps to push the solid particles into said conical body (17A), preventing the particles from sticking to the inlet of the lower conical body (1). The acceleration air going into the pressure chamber is driven through an auxiliary fan, which takes the outlet air from the side opening for the acceleration air outlet (5) of the upper cylindrical body (3) and it inputs it again to the accelerating cyclone through the side opening for the acceleration air input (8) of the central cylindrical body (2), said acceleration air generates an air cushion in the pressure chamber.

In summary, the accelerating cyclone is capable of carrying out the following operations:

- Separate the micro-dispersed water from the particulate material.
- Accelerate the particulate material by means of an accelerator system, using the set-point temperature provided by the mixture of input solid particles with no additional source of heating energy and without producing particle glue on the walls.
- It is complemented by a surface pressure system consisting of the elongated pressure vanes (14) that is designed to clean and prevent the particle speed from decreasing.
- It is complemented by a superficial dispersion system consisting of the slotted cylinder (15) that allows the particles not to rotate on the surface and to remain suspended inside. On the other hand, the dispersion system accelerates the particle speed.
- The cone, given its shape, avoids chambers and low pressure discontinuities, which prevents the particulate material from lodging on the interior walls. Given the regulation of the humid air output and the shape of the cone, an offset, where the high and low pressures produced inside the cone generate buoyancy of the particles and no adhesion to the walls, occurs.
- It has regulation of the air output by means of the adjustment cone (7) managing to regulate the internal pressure and the buoyancy of the particles.

Furthermore, the cyclone can be a part of an integrated system to separate solid particles, as in FIG. 7, where the system can comprise:

- an accelerating cyclone, comprising a lower outlet (18) for the granulate or powder product output;
- an auxiliary fan or high pressure fan (23) connected to the accelerating cyclone that takes the dry fine particles evacuated from the accelerating cyclone through the upper side opening for the acceleration air outlet and returns them to the same cyclone through the acceleration air inlet;
- at least one turbine (24) tangentially connected to the accelerating cyclone;
- a material feeder (25) that receives the solid material to be processed through an upper opening and regulates the input speed of said solid material to be processed;
- a pneumatic lock or star valve (26) which receives the solid material from the material feeder and feeds the turbine (24) of the system through the duct connecting the material feeder with the turbine (24); and a heater (27) comprising an inlet or supply duct for the input of air necessary in the process, and having an outlet duct on the rear central portion, which is hooked to the duct which allows the turbine (24) to be connected to the star valve assembly and material feeder.

The procedure for activating the integrated system begins by starting the turbine or turbines (24), then the auxiliary fan (23), then turning on the heater (27) and, finally, by activating the pneumatic lock or star valve (26) and the material feeder (25).

The procedure comprises the air input, at room temperature, into the inlet duct of the heater in order to increase the air temperature to the set-point or process temperature, necessary to keep the walls of the system free of humidity, in the ducts as much as in the cyclone equipment, and reduce the relative humidity of the input air (preferably, the temperature is kept in the range of about 40° C. to about 70° C., enough to lower the air relative humidity to levels below 20% or less); the input of solid material to be treated through the material feeder, which regulates the flow speed of material entering the system; the flow of material then passes to the star valve, where the material atmospheric pressure is changed to negative pressure; then the air-borne solid material enters the high-speed turbine (24), where the air is sucked so that the solid material passes through said turbine (24), and the breaking of the solid input material and the dissociation of the water contained in said solid material take place efficiently; the solid material of smaller size with the dissociated water subsequently enters the accelerating cyclone, where the separation of the water and the powdered solid material particles exiting through the cyclone lower outlet, finally takes place.

The time elapsed from inputting the material to be treated to forming the final powder product is short, preferably almost instantaneous, and during that time the initial water of the material to be treated is reduced by about 80%, preferably about 90%. In addition, since the material circulation speed in the system is fast, the temperature of the final product does not increase.

The design of the system ducts, both the circulation ducts and the inflow and outflow ducts of the equipment, has been defined in such a way that the tangential and axial displacement of the solid material while circulating in the system is maintained. Likewise, the heater is designed to achieve tangential displacement, and the high-speed turbine creates negative pressure and axial and tangential displacement of the input material.

On the other hand, the adjustment of the set-point temperatures is relevant for each material in such a way that it avoids being subjected to the sticky zone and allows the condition of free flowing of the material.

In addition, an acoustic synergy is achieved between the turbine (24) and the accelerating cyclone. The turbine creates the ultrasound effect, the cyclone acting as a sounding board, in order to receive the low-frequency waves and higher harmonics that allow the resonance effect to be kept for a longer period.

The dissociation of the water from the matter is caused by the turbine, the accelerating cyclone producing the effect of containment and separation of the matter with the microdispersed water in a closed system.

The turbine improves the heat transfer coefficient by receiving the product at negative pressure (vacuum), dissociating the water by physical effects (ultrasound, friction, centrifugation), thus allowing the water particles to be microdispersed and sent at high positive pressure to the system of separation and acceleration of the cyclone.

The assembly and design allow for dewatering raw materials also at room temperature without application of any additional heat source.

The acceleration of the particles as created by the auxiliary or high-pressure fan in the internal acceleration chamber of the cyclone is intended to create a better separation of the matter with the microdispersed water and, in turn, preventing the material from adhering to the cyclone walls.

The auxiliary or high-pressure fan uses the cyclone outlet air to cause the effect of particle acceleration and anti-adhesion, which is efficient as it requires no air with additional heat source, when the system operates with an external heat source through a heater.

The high-pressure fan takes the dry fine particles as evacuated from the accelerating cyclone and returns them thereto, thus allowing these (fine dry particles) to mix with the wettest input material and facilitating that material with higher humidity to move freely and without adhesion in the accelerating cyclone.

The invention claimed is:

1. Accelerating cyclone that separates solid particles to provide powder and/or granulated dehydrated, with low-moisture-percentage, solid products from materials selected from the group consisting of food raw materials, vegetable flour, vegetable powder, fruit powder, fruit flour, agro-industrial wastes, sludge from sanitation industries, and sludge from manufacturing industries, and combinations thereof, comprising:

a lower conical body, a central cylindrical body immediately above the conical body whose diameter is smaller than the largest diameter of the conical body cone, and a third upper, also cylindrical, body of smaller diameter than the diameter of the central cylindrical body;

the third upper cylindrical body is structurally divided into two sections, one upper section of larger diameter and one lower section of smaller diameter, and in that said upper cylindrical body vents and regulates the process air once the solid particles are separated, and said upper cylindrical body comprises:

i) an upper opening for the output of the process air;

ii) a side opening for the output of the acceleration air, which is located on the upper side portion of the section of larger diameter;

iii) a set of radial supports located internally in the upper section of greater diameter; and iv) an adjustment cone of the outlet air, which is adjustable in its position allowing it to be adjusted upwards or downwards, whose function is managing to regulate the internal pressure and the buoyancy of the particles and which is located internally in the section with the largest diameter, immediately below the assembly of radial supports, approximately halfway the total height of the cylindrical upper body; and where the cylindrical central body allows to accelerate the speed of the solid material particles and is the cyclone pressure chamber; and where said cylindrical central body comprises:

a) a side opening for the acceleration air input;

b) at least one duct projecting from inside the central cylindrical body for the input of the mixture of solid particles and air, or also referred as air-borne solid particles, to the accelerating cyclone located on the opposite side with respect to the side opening for the input of the acceleration air, c) a rotating turbine located inside said cylindrical central body;

d) at least two elongated pressure vanes distributed symmetrically along the diameter of the rotating turbine; and e) an inner cylinder located inside said central body which is formed by a non-slotted cylinder located in the upper part of the inner cylinder and by a slotted cylinder, located under the non-slotted cylinder.

2. The accelerating cyclone according to claim 1, wherein the slotted cylinder has a multiplicity of slots and has a smaller diameter than the outer diameter of the central body, but larger than the diameter of the rotating turbine, and makes the solid material particles not to touch the surface, not to stick or adhere to the walls and, therefore, that they remain suspended inside the accelerating cyclone.

3. The accelerating cyclone according to claim 1, wherein the acceleration air going into the central cylindrical body or accelerating cyclone pressure chamber is supplied by the auxiliary fan.

4. The accelerating cyclone according to claim 1, wherein the lower conical body comprises:

A) a lower conical section;

B) a concave curve upper section, located in the upper part of the conical lower section; and C) a lower opening for the output of the final product from solid particles.

5. The accelerating cyclone according to claim 4, wherein the concave curve upper section has a smaller diameter with respect to the larger diameter of the conical lower section and in that said concave curve upper section helps to push the solid particles into the conical body.

6. The accelerating cyclone according to claim 1, wherein:

the rotating turbine comprises a wheel formed by two concentric parallel rings and by several radial rectangular vanes distributed along the perimeter of said rotating turbine and supported on a central ring;

the two elongated pressure vanes are distributed symmetrically along the diameter of the rings and joined perpendicularly to the lower ring of the wheel of the rotating turbine; and the part of the non-slotted cylinder is aligned with the radial rectangular vanes of the rotating turbine and has a height equivalent to or greater than the height of the radial rectangular vanes of the rotating turbine and is constructed with at least one ejector mechanism, on its outer surface.

7. The accelerating cyclone according to claim 6, wherein the elongated pressure vanes are parallel to the inner wall of said central body and of a length equivalent to the height of said central body.

8. The accelerating cyclone according to claim 6, wherein-the ejector mechanism is formed by an opening constructed in the part of the non-slotted cylinder, a vane that emerges tangentially from the cylinders over the opening and two supports, located at the side ends of the tangentially emerging vane, which allow the union between the tangentially emerging vane and the cylinders.

9. The accelerating cyclone according to claim 6, wherein the elongated pressure vanes are spaced at a minimum distance from the slotted cylinder walls in order to ensure that no solid material remains trapped on the surface of said slotted cylinder, and the rotating turbine generates a circulatory movement of the air, and the elongated pressure vanes generate surface pressures and prevent the reduction of the particle speed, since the elongated pressure vanes move at a higher speed than the solid particles, so at the moment the air-borne solid particles come into contact with the rotating turbine, said rotating turbine is rotating at a speed higher than the speed of the solid particles, due to the air input through the acceleration air inlet.

* * * * *